(12) United States Patent
Li et al.

(10) Patent No.: US 11,990,793 B2
(45) Date of Patent: May 21, 2024

(54) VERNIER PERMANENT MAGNET MOTOR WITH STATOR HAVING CODED AUXILIARY TEETH

(71) Applicant: HUAZHONG UNIVERSITY OF SCIENCE AND TECHNOLOGY, Hubei (CN)

(72) Inventors: Dawei Li, Hubei (CN); Li Fang, Hubei (CN); Xiang Ren, Hubei (CN); Ronghai Qu, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 288 days.

(21) Appl. No.: 17/765,847

(22) PCT Filed: Jan. 21, 2021

(86) PCT No.: PCT/CN2021/072975
§ 371 (c)(1),
(2) Date: Apr. 1, 2022

(87) PCT Pub. No.: WO2022/095282
PCT Pub. Date: May 12, 2022

(65) Prior Publication Data
US 2023/0336039 A1    Oct. 19, 2023

(30) Foreign Application Priority Data

Nov. 9, 2020    (CN) .......................... 202011227689.3

(51) Int. Cl.
*H02K 1/17*    (2006.01)
*H02K 1/14*    (2006.01)

(52) U.S. Cl.
CPC .............. *H02K 1/17* (2013.01); *H02K 1/146* (2013.01)

(58) Field of Classification Search
CPC ........ H02K 1/17; H02K 1/146; H02K 1/2746; H02K 1/2791; H02K 1/278; H02K 1/2786; H02K 21/024; H02K 2201/03
(Continued)

(56) References Cited

U.S. PATENT DOCUMENTS

2017/0324295 A1*  11/2017  Tomonaga ............... H02K 1/02

FOREIGN PATENT DOCUMENTS

| CN | 103795159 | 5/2014 |
|---|---|---|
| CN | 109378918 | 2/2019 |

(Continued)

OTHER PUBLICATIONS

"International Search Report (Form PCT/ISA/210) of PCT/CN2021/072975," mailed on Aug. 17, 2021, pp. 1-5.
(Continued)

*Primary Examiner* — Jeremy A Luks
(74) *Attorney, Agent, or Firm* — JCIPRNET

(57) ABSTRACT

A vernier permanent magnet motor with a stator having coded auxiliary teeth which belongs to the technical field of permanent magnet motors. The motor includes a stator and a rotor that are coaxially sleeved, and an air gap is formed between the stator and the rotor. Coded auxiliary tooth structures are provided on a side surface in the stator close to the air gap, and first permanent magnets are provided on part of the coded auxiliary tooth structures. A plurality of pairs of second permanent magnets and ferromagnets are arranged around a side surface in the rotor close to the air gap. The first permanent magnets and the ferromagnets generate a first magnetic field, the second permanent magnets and the coded auxiliary tooth structures generate a second magnetic field, and the magnetic fields are superimposed to form working magnetic fields.

16 Claims, 4 Drawing Sheets

(58) Field of Classification Search
USPC .................................................. 310/154.01
See application file for complete search history.

(56) References Cited

FOREIGN PATENT DOCUMENTS

| CN | 109378918 A | * | 2/2019 | |
| CN | 110460182 A | * | 11/2019 | ............. H02K 1/148 |
| CN | 111064332 A | * | 4/2020 | |
| KR | 20190074136 | | 6/2019 | |

OTHER PUBLICATIONS

"Written Opinion of the International Searching Authority (Form PCT/ISA/237) of PCT/CN2021/072975," mailed on Aug. 17, 2021, pp. 1-3.

* cited by examiner

VERNIER PERMANENT MAGNET MOTOR WITH STATOR HAVING CODED AUXILIARY TEETH

CROSS-REFERENCE TO RELATED APPLICATION

This application is a 371 of international application of PCT application serial no. PCT/CN2021/072975, filed on Jan. 21, 2021, which claims the priority benefit of China application no. 202011227689.3, filed on Nov. 9, 2020. The entirety of each of the above-mentioned patent applications is hereby incorporated by reference herein and made a part of this specification.

TECHNICAL FIELD

The disclosure belongs to the technical field of permanent magnet motors, and in particularly, relates to a vernier permanent magnet motor with a stator having coded auxiliary teeth.

DESCRIPTION OF RELATED ART

Motors, serving as the core parts of major manufacturing equipment such as industrial robots, chip manufacturing equipment, and computer numerical control machine tools, motors play an important role in the performance of manufacturing equipment. With the continuous improvement of the performance of manufacturing equipment, motors are required to provide improved performance in terms of torque density, response speed, torque ripple, etc.

High torque density has always been the main goal of motor development, which is crucial for reducing the volume and costs of the driving system and improving the response speed of the system. The torque density of conventional permanent magnet motors is limited by the development of high-performance materials and cooling systems, and it is difficult to be improved.

SUMMARY

Regarding the defects or the requirement for improvement in the related art, the disclosure provides a vernier permanent magnet motor with a stator having coded auxiliary teeth, aiming to improve the torque density of the motor without increasing the number of permanent magnets that are required to be used, so that the motor is provided with an improved torque output capability.

To achieve the above, according to an aspect of the disclosure, the disclosure provides a vernier permanent magnet motor with a stator having coded auxiliary teeth including a stator and a rotor that are coaxially sleeved, and an air gap is formed between the stator and the rotor. Coded auxiliary tooth structures are provided on a side surface in the stator close to the air gap, and first permanent magnets are provided on part of the coded auxiliary tooth structures. A plurality of pairs of second permanent magnets and ferromagnets are arranged around a side surface in the rotor close to the air gap, and the second permanent magnets and the ferromagnets are arranged in an alternating manner. Herein, the first permanent magnets and the ferromagnets are configured to generate a first magnetic field, and the second permanent magnets and the coded auxiliary tooth structures are configured to generate a second magnetic field. Magnetic fields formed by superposition of the first magnetic field and the second magnetic field are working magnetic fields of the vernier permanent magnet motor.

Further, the coded auxiliary tooth structures are formed by superposing a plurality of groups of tooth structure arrays evenly distributed in a circumferential direction, and numbers of teeth, spatial positions, and tooth widths of the groups of tooth structure arrays are different.

Further, the stator includes a stator yoke, a main tooth structure, and the coded auxiliary tooth structures sequentially arranged on a side surface of the stator yoke.

Further, the main tooth structure is formed by a plurality of main teeth arranged in an alternating manner with a first tooth diameter and a second tooth diameter, and the first tooth diameter is less than the second tooth diameter.

Further, the vernier permanent magnet motor further includes: windings, arranged around an outer side of the main teeth whose tooth diameter is the second tooth diameter.

Further, the second permanent magnets are magnetized radially, and magnetizing directions are identical.

Further, the first permanent magnets are magnetized radially, and magnetizing directions are identical to magnetizing directions of the second permanent magnets.

Further, a material of the coded auxiliary tooth structures is a ferromagnetic material.

Further, the vernier permanent magnet motor further includes: a rotating shaft. The stator and the rotor are sequentially sleeved on an outer side of the rotating shaft, or the rotor and the stator are sequentially sleeved on the outer side of the rotating shaft.

In general, the above technical solutions provided by the disclosure have the following beneficial effects:

(1) The stator teeth interact with the permanent magnets on the rotor to generate a magnetic field, and the permanent magnets on the stator teeth interact with the ferromagnets on the rotor to generate a magnetic field. The two magnetic fields are superimposed on each other to form multiple working magnetic fields, and the working magnetic fields exhibit increased amplitudes, so that the motor is provided with an improved torque output capability and an increased motor torque density.

(2) Harmonics of the multiple working magnetic fields generated by the interaction between the coded auxiliary teeth and the permanent magnets on the rotor may induce back electromotive forces with the same phase in the windings. As such, a higher torque may be outputted under the same number of permanent magnets that are used. Similarly, the magnetic field generated by the interaction of the permanent magnets on the stator teeth and the ferromagnetic pole of the rotor also exhibits this characteristic, thus making the motor have an increased torque density.

(3) The stator teeth are designed as an integrated structure of the main teeth and the auxiliary teeth, and wide main teeth and narrow main teeth are arranged in an alternating manner. The wider main teeth are wound with winding coils, and the narrower main teeth provide larger slot space for the winding coils, so that a slot filling factor of the winding coils is increased. Permanent magnets are arranged on the auxiliary teeth to ensure that the permanent magnets have a large installation area, and the torque output capacity of the motor may thus be further improved.

(4) The windings are formed as single-layer concentrated windings, which are rich in harmonics and may be interlinked with multiple harmonics of the excitation working magnetic fields to generate electromechanical energy conversion, and improved motor torque output capability is therefore provided.

BRIEF DESCRIPTION OF THE DRAWINGS

In the accompanying drawings, the same reference numerals are used to represent identical or similar elements or structures, where.

1: stator, 11: coded auxiliary tooth structure, 12: first permanent magnet, 13: stator yoke, 14: main tooth structure, 2: rotor, 21: second permanent magnet, 22: ferromagnet, 3: air gap, 4: winding, 5: rotating shaft.

DESCRIPTION OF THE EMBODIMENTS

In order to make the objectives, technical solutions, and advantages of the disclosure clearer and more comprehensible, the disclosure is further described in detail with reference to the drawings and embodiments. It should be understood that the specific embodiments described herein serve to explain the disclosure merely and are not used to limit the disclosure. In addition, the technical features involved in the various embodiments of the disclosure described below can be combined with each other as long as the technical features do not conflict with each other.

In the disclosure, the terms "first", "second", and the like (if any) in the disclosure and the accompanying drawings are used to distinguish similar objects, and are not necessarily used to describe a specific order or sequence.

Figure 1:
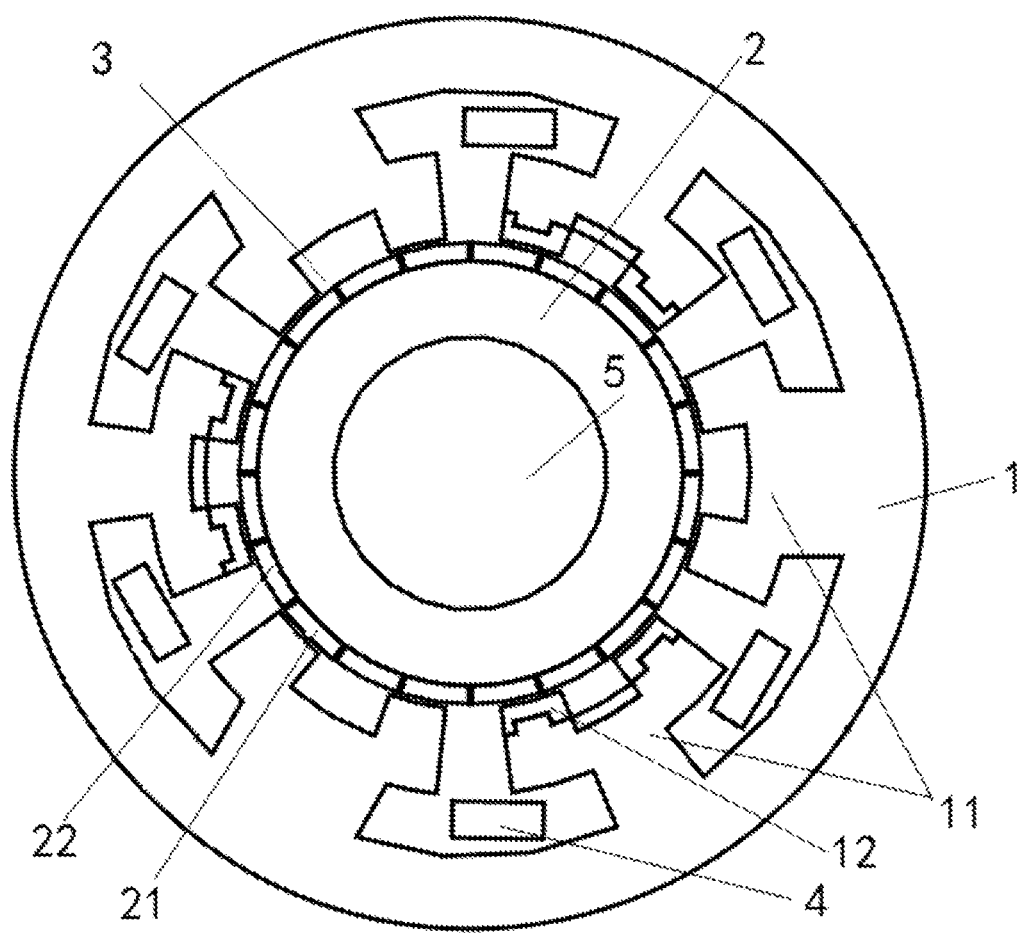
FIG. 1 is a schematic view of a vernier permanent magnet motor with a stator having coded auxiliary teeth according to an embodiment of the disclosure.

FIG. 1 is a schematic view of a vernier permanent magnet motor with a stator having coded auxiliary teeth according to an embodiment of the disclosure. With reference to FIG. 1 and FIG. 2A to FIG. 6 together, the vernier permanent magnet motor with the stator having the coded auxiliary teeth is described in detail.

The vernier permanent magnet motor with the stator having the coded auxiliary teeth includes a stator 1 and a rotor 2 that are coaxially sleeved, and an air gap 3 is formed between the stator 1 and the rotor 2. Coded auxiliary tooth structures 11 are provided on a side surface in the stator 1 close to the air gap 3, and first permanent magnets 12 are provided on part of the coded auxiliary tooth structures 11. A plurality of pairs of second permanent magnets 21 and ferromagnets 22 are arranged around a side surface in the rotor 2 close to the air gap 3, and the second permanent magnets 21 and the ferromagnets 22 surround the side surface in the rotor 2 close to the air gap 3 in an alternating manner. The first permanent magnets 12 and the ferromagnets 22 interact to generate a first magnetic field, and the second permanent magnets 21 and the coded auxiliary tooth structures 11 interact to generate a second magnetic field. Directions of the first magnetic field and the second magnetic field are the same, and magnetic fields formed by superposition of the first magnetic field and the second magnetic field are working magnetic fields of the vernier permanent magnet motor to improve a torque output capability of the motor.

Figure 2A:
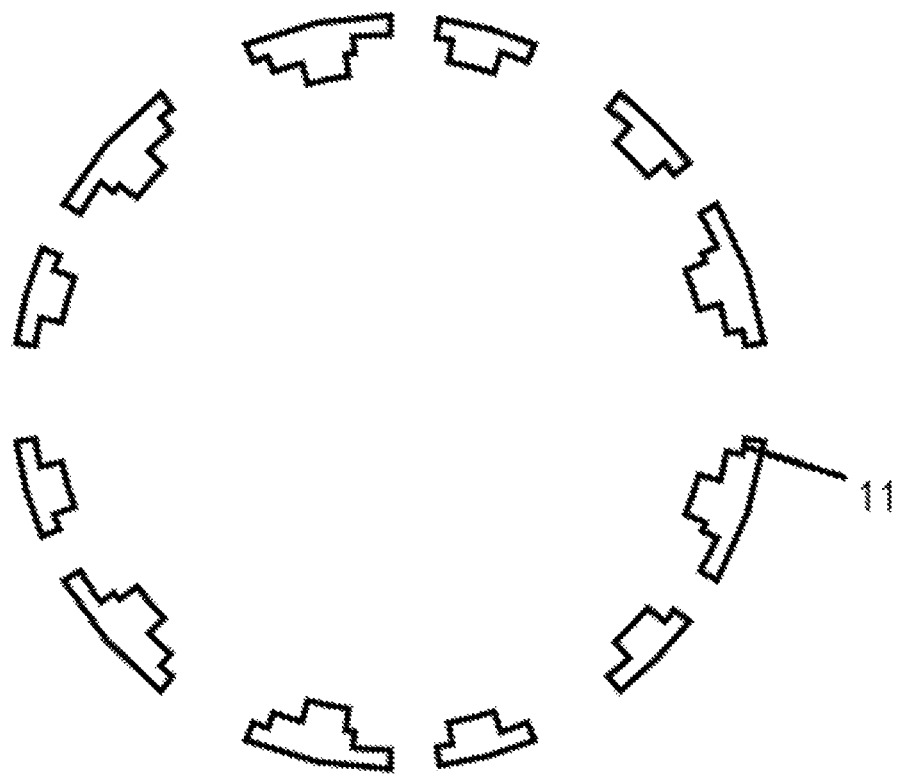
FIG. 2A is a schematic view of an initial structure of the coded auxiliary teeth in the vernier permanent magnet motor with the stator having the coded auxiliary teeth according to an embodiment of the disclosure.
Figure 2B:
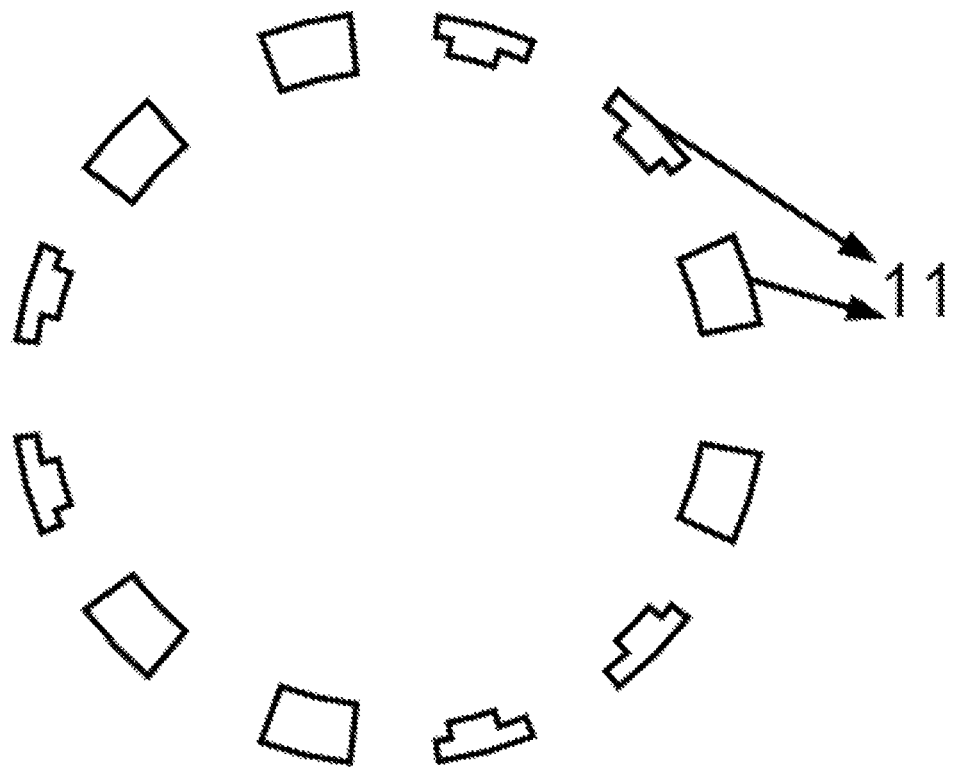
FIG. 2B is a schematic view of an optimized structure of the coded auxiliary teeth in the vernier permanent magnet motor with the stator having the coded auxiliary teeth according to an embodiment of the disclosure.

The coded auxiliary tooth structures 11 are formed by superposing a plurality of groups of tooth structure arrays evenly distributed in a circumferential direction in this embodiment, and numbers of teeth, spatial positions, and tooth widths of the groups of tooth structure arrays are different. To be specific, the coded auxiliary tooth structures 11 are obtained by superimposing and optimizing multiple groups of tooth structure arrays with regular shapes and exhibiting uniform distribution in the circumferential direction. Air-gap magnetic fields generated by the interaction between these individual tooth structure arrays and the second permanent magnets may induce back electromotive forces in the windings, and phases of the back electromotive forces are the same. Therefore, these tooth structure arrays are superimposed to obtain initial coded auxiliary teeth. As shown in FIG. 2A, this process is similar to an encoding process of an encoder, so it is named as coded auxiliary teeth. In order to make the working magnetic fields of the air gap larger, the structure of the coded auxiliary teeth is further optimized to obtain the final coded auxiliary teeth, as shown in FIG. 2B. Therefore, under the same motor volume and the same number of permanent magnets, the vernier permanent magnet motor with the coded auxiliary teeth may output higher torque than a vernier permanent magnet motor with a stator having a common split-tooth structure. Similarly, the number of coded auxiliary teeth provided with the first permanent magnets 12 and the size of the first permanent magnets 12 may be optimally designed according to performance of the motor. In this way, harmonics of the working magnetic fields generated by the interaction between the first permanent magnets 12 and the ferromagnets 22 generate back electromotive forces of the same phase in the windings, so that the torque output capability of the motor is further increased.

Figure 6:
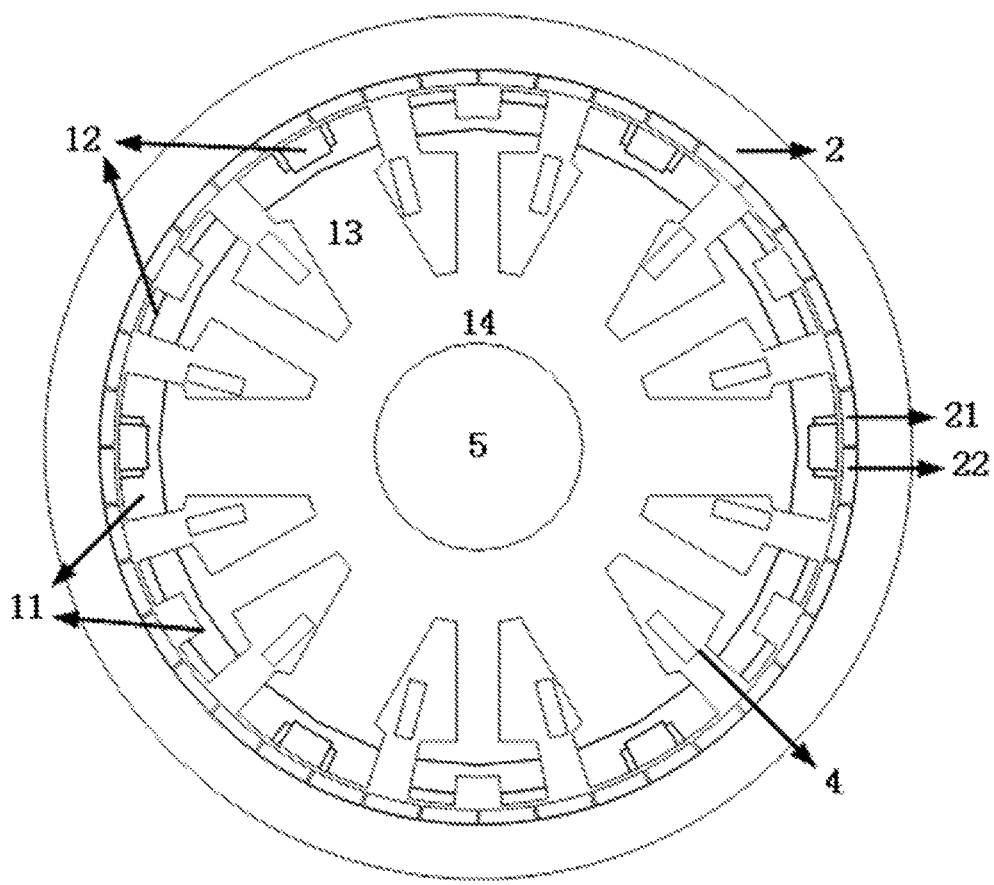
FIG. 6 is a schematic view of a vernier permanent magnet motor with a stator having coded auxiliary teeth according to another embodiment of the disclosure.

The vernier permanent magnet motor further includes a rotating shaft 5. The rotor 2 and the stator 1 are sequentially sleeved on an outer side of the rotating shaft 5, a radial direction from the outside to the inside is the stator 1, the rotor 2, and the rotating shaft 5, and the formed structure is shown in FIG. 1. Alternatively, the stator 1 and the rotor 2 are sequentially sleeved on the outer side of the rotating shaft 5, the radial direction from the outside to the inside is the rotor 2, the stator 1, and the rotating shaft 5, and the formed structure is shown in FIG. 6.

Figure 3:
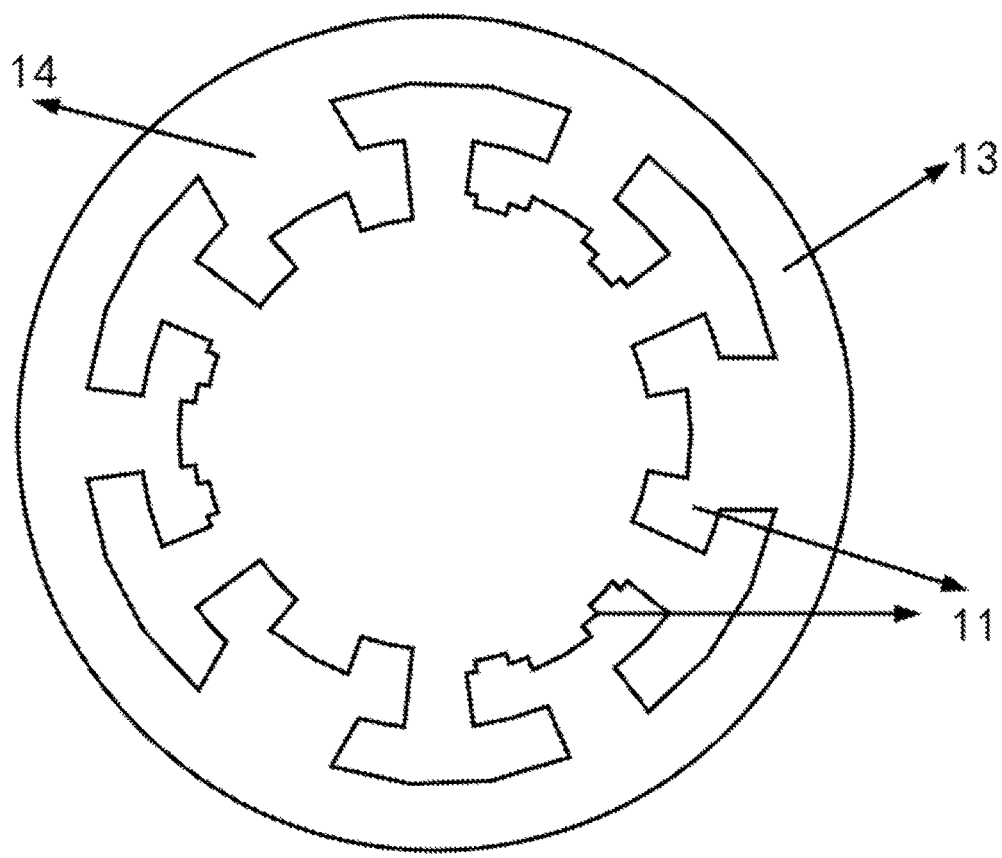
FIG. 3 is a schematic view of a structure of the stator in the vernier permanent magnet motor with the stator having the coded auxiliary teeth according to an embodiment of the disclosure.
Figure 4:
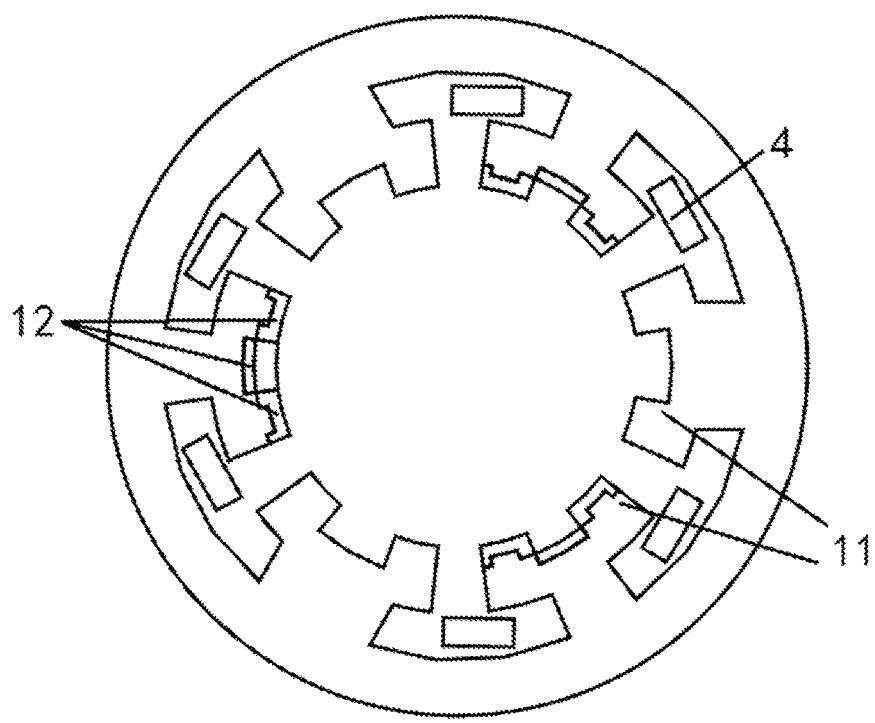
FIG. 4 is a schematic view of the structure of the vernier permanent magnet motor with the stator having the coded auxiliary teeth after permanent magnets are installed and windings are wound on a stator side according to an embodiment of the disclosure.

In the embodiments of the disclosure, the stator 1 includes a stator yoke 13, a main tooth structure 14, and the coded auxiliary tooth structures 11 sequentially arranged on a side surface of the stator yoke 13. Main teeth in the main tooth structure 14 correspond to the coded auxiliary teeth in the coded auxiliary tooth structures 11 one to one. The coded auxiliary tooth structures 11 are integrated with the main tooth structure 14 to form stator tooth structures, and the finally formed stator is shown in FIG. 3. The number of stator tooth structures is, for example, 6, and the number of stator tooth structures provided with the first permanent magnets 12 is, for example, 3, that is, 3 coded auxiliary teeth are provided with permanent magnets, as shown in FIG. 4.

In the embodiments of the disclosure, the main tooth structure 14 is formed by a plurality of main teeth arranged in an alternating manner with a first tooth diameter and a second tooth diameter, and the first tooth diameter is less than the second tooth diameter. A tooth diameter of the main teeth refers to a size of the main teeth in the circumferential direction of the stator, and may also be defined as a width of the main teeth.

The vernier permanent magnet motor with the stator having the coded auxiliary teeth further includes windings 4, and the windings 4 are arranged around an outer side of the main teeth whose tooth diameter is the second tooth diameter, as shown in FIG. 1. The main teeth on the stator are arranged in a structure formed by wide main teeth and narrow main teeth arranged in an alternating manner. The wider main teeth are wound with winding coils, and the narrower main teeth provide larger slot space for the winding coils, so that a slot filling factor of the winding coils is increased. In this way, the vernier permanent magnet motor outputs increased torque, and the winding coils may be easily wound and installed. Specific winding coils are connected in series or in parallel to form phase windings, for example, the windings 4 wound on spatially opposite main teeth are connected in series to form one phase winding.

Figure 5:
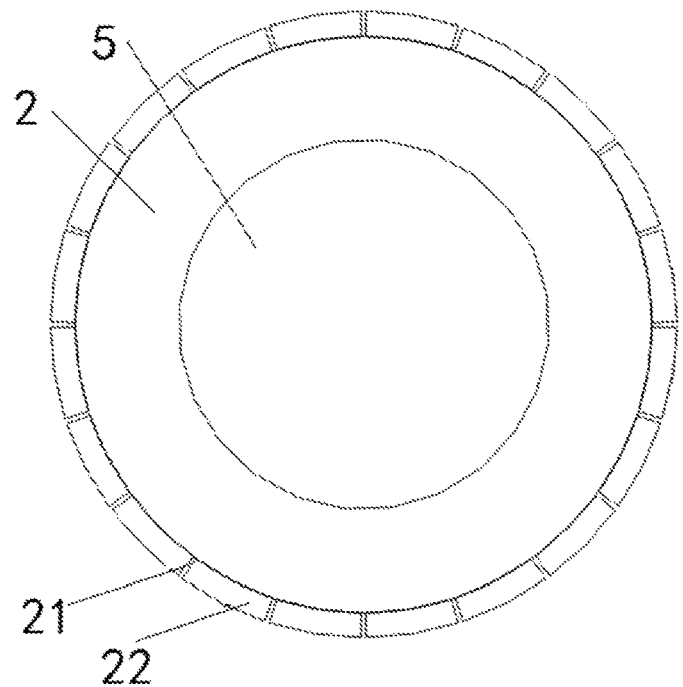
FIG. 5 is a schematic view of a structure of a rotor in the vernier permanent magnet motor with the stator having the coded auxiliary teeth according to an embodiment of the disclosure.

The second permanent magnets 21 and the ferromagnets 22 arranged in an alternating manner surround the side surface in the rotor 2 close to the air gap 3. The motor structure with the stator disposed outside shown in FIG. 1 is treated as an example again, the structure formed by the rotor 2, the second permanent magnets 21, and the ferromagnets 22 is shown in FIG. 5.

In the embodiments of the disclosure, the second permanent magnets 21 on the rotor 2 are magnetized radially, and magnetizing directions of the second permanent magnets 21 are the same. The first permanent magnets 12 on the coded auxiliary tooth structures 11 are magnetized radially as well, and magnetizing directions of the first permanent magnets 12 are identical to the magnetizing directions of the second permanent magnets 21. For instance, the magnetizing directions of all the first permanent magnets 12 and the second permanent magnets 21 are radially inward or radially outward.

A material of the coded auxiliary tooth structures 11 is a ferromagnetic material, and a material of the main tooth structure 14 is also a ferromagnetic material. A material of the rotor 2 is a ferromagnetic material. The ferromagnetic material is, for example, iron, steel, nickel, cobalt, etc. Accordingly, the permanent magnet arrays on the rotor 2 interacts with the ferromagnetic coded auxiliary tooth structures 11 on the stator 1 to generate a magnetic field, and the ferromagnetic arrays on the rotor 2 interacts with the permanent magnets on the coded auxiliary tooth structures 11 to generate another magnetic field. The two magnetic fields are superimposed on each other to generate more working magnetic fields with greater amplitudes, so that the motor is able to provide an improved torque output capability on the basis of using less permanent magnet materials.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A vernier permanent magnet motor with a stator having coded auxiliary teeth, comprising a stator and a rotor that are coaxially sleeved, wherein an air gap is formed between the stator and the rotor,
    coded auxiliary tooth structures are provided on a side surface in the stator close to the air gap, and first permanent magnets are provided on part of the coded auxiliary tooth structures,
    a plurality of pairs of second permanent magnets and ferromagnets are arranged around a side surface in the rotor close to the air gap, and the second permanent magnets and the ferromagnets are arranged in an alternating manner,
    wherein the first permanent magnets and the ferromagnets are configured to generate a first magnetic field, the second permanent magnets and the coded auxiliary tooth structures are configured to generate a second magnetic field, and magnetic fields formed by superposition of the first magnetic field and the second magnetic field are working magnetic fields of the vernier permanent magnet motor.

2. The vernier permanent magnet motor with the stator having the coded auxiliary teeth according to claim 1, wherein the coded auxiliary tooth structures are formed by superposing a plurality of groups of tooth structure arrays evenly distributed in a circumferential direction, and numbers of teeth, spatial positions, and tooth widths of the groups of tooth structure arrays are different.

3. The vernier permanent magnet motor with the stator having the coded auxiliary teeth according to claim 2, wherein the vernier permanent magnet motor further comprises:
    a rotating shaft, wherein the stator and the rotor are sequentially sleeved on an outer side of the rotating shaft, or the rotor and the stator are sequentially sleeved on the outer side of the rotating shaft.

4. The vernier permanent magnet motor with the stator having the coded auxiliary teeth according to claim 1, wherein the stator comprises a stator yoke, a main tooth structure, and the coded auxiliary tooth structures sequentially arranged on a side surface of the stator yoke.

5. The vernier permanent magnet motor with the stator having the coded auxiliary teeth according to claim 4, wherein the vernier permanent magnet motor further comprises:
    a rotating shaft, wherein the stator and the rotor are sequentially sleeved on an outer side of the rotating shaft, or the rotor and the stator are sequentially sleeved on the outer side of the rotating shaft.

6. The vernier permanent magnet motor with the stator having the coded auxiliary teeth according to claim 4, wherein the main tooth structure is formed by a plurality of main teeth arranged in an alternating manner with a first tooth diameter and a second tooth diameter, and the first tooth diameter is less than the second tooth diameter.

7. The vernier permanent magnet motor with the stator having the coded auxiliary teeth according to claim 6, wherein the vernier permanent magnet motor further comprises:
    a rotating shaft, wherein the stator and the rotor are sequentially sleeved on an outer side of the rotating shaft, or the rotor and the stator are sequentially sleeved on the outer side of the rotating shaft.

8. The vernier permanent magnet motor with the stator having the coded auxiliary teeth according to claim 6, wherein the vernier permanent magnet motor further comprises: windings, arranged around an outer side of the main teeth whose tooth diameter is the second tooth diameter.

9. The vernier permanent magnet motor with the stator having the coded auxiliary teeth according to claim 8, wherein the vernier permanent magnet motor further comprises:
a rotating shaft, wherein the stator and the rotor are sequentially sleeved on an outer side of the rotating shaft, or the rotor and the stator are sequentially sleeved on the outer side of the rotating shaft.

10. The vernier permanent magnet motor with the stator having the coded auxiliary teeth according to claim 1, wherein the second permanent magnets are magnetized radially, and magnetizing directions are identical.

11. The vernier permanent magnet motor with the stator having the coded auxiliary teeth according to claim 10, wherein the vernier permanent magnet motor further comprises:
a rotating shaft, wherein the stator and the rotor are sequentially sleeved on an outer side of the rotating shaft, or the rotor and the stator are sequentially sleeved on the outer side of the rotating shaft.

12. The vernier permanent magnet motor with the stator having the coded auxiliary teeth according to claim 1, wherein the first permanent magnets are magnetized radially, and magnetizing directions are identical to magnetizing directions of the second permanent magnets.

13. The vernier permanent magnet motor with the stator having the coded auxiliary teeth according to claim 12, wherein the vernier permanent magnet motor further comprises:
a rotating shaft, wherein the stator and the rotor are sequentially sleeved on an outer side of the rotating shaft, or the rotor and the stator are sequentially sleeved on the outer side of the rotating shaft.

14. The vernier permanent magnet motor with the stator having the coded auxiliary teeth according to claim 1, wherein a material of the coded auxiliary tooth structures is a ferromagnetic material.

15. The vernier permanent magnet motor with the stator having the coded auxiliary teeth according to claim 14, wherein the vernier permanent magnet motor further comprises:
a rotating shaft, wherein the stator and the rotor are sequentially sleeved on an outer side of the rotating shaft, or the rotor and the stator are sequentially sleeved on the outer side of the rotating shaft.

16. The vernier permanent magnet motor with the stator having the coded auxiliary teeth according to claim 1, wherein the vernier permanent magnet motor further comprises:
a rotating shaft, wherein the stator and the rotor are sequentially sleeved on an outer side of the rotating shaft, or the rotor and the stator are sequentially sleeved on the outer side of the rotating shaft.

\* \* \* \* \*